H. W. PLEISTER.
BOLT ANCHOR.
APPLICATION FILED JAN. 20, 1915.
1,155,613.
Patented Oct. 5, 1915.
3 SHEETS—SHEET 1.
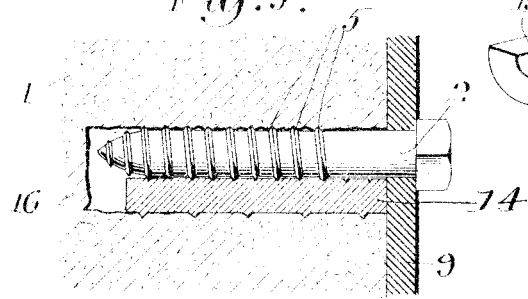
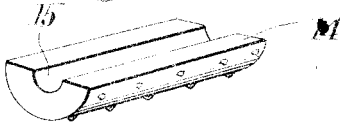
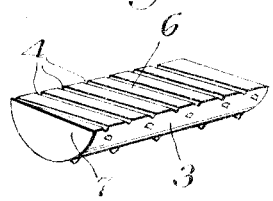
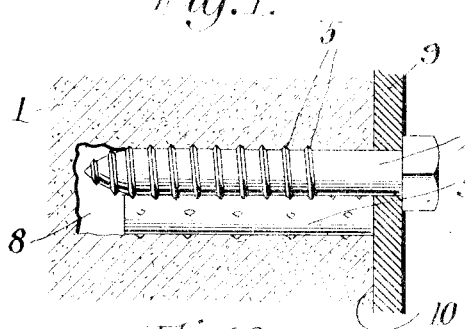
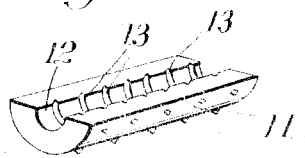
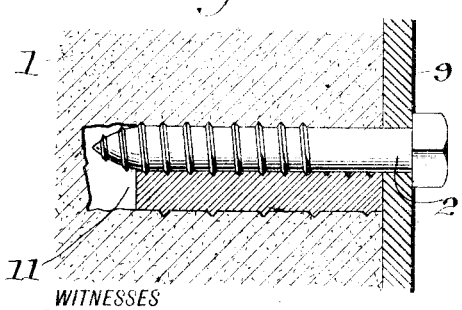
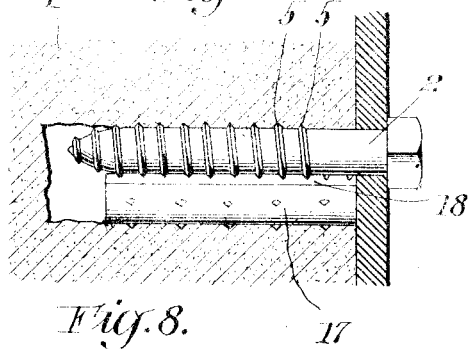
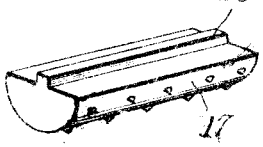
WITNESSES
John D Morgan
Louisa Lachs
INVENTOR
Henry W. Pleister
BY Alan M Johnson
ATTORNEY

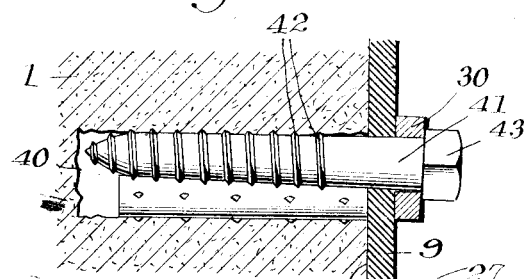
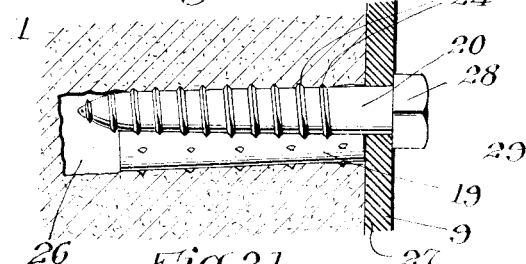
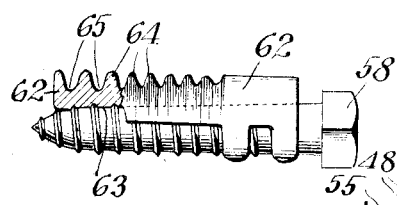
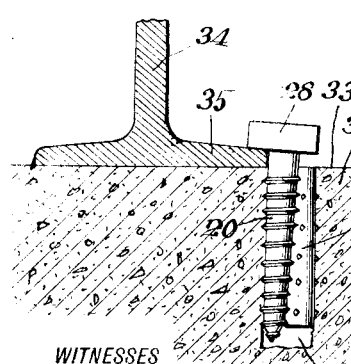
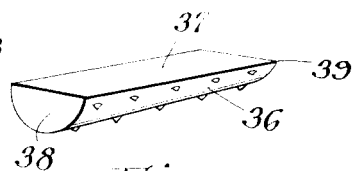
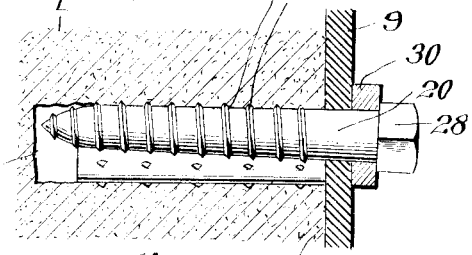
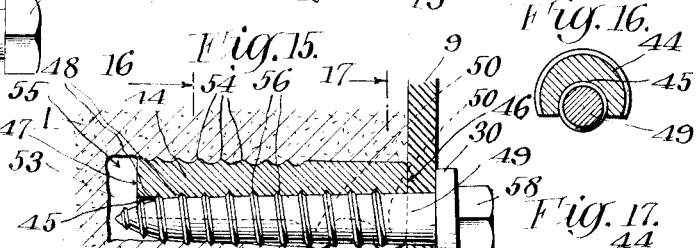
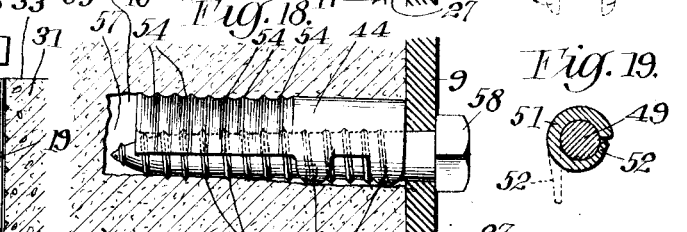
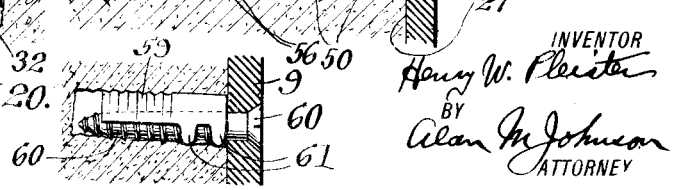

H. W. PLEISTER.
BOLT ANCHOR.
APPLICATION FILED JAN. 20, 1915.
1,155,613.
Patented Oct. 5, 1915.
3 SHEETS—SHEET 3.
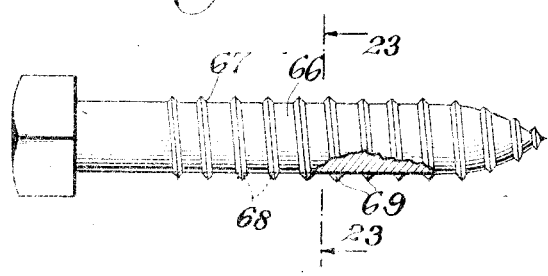
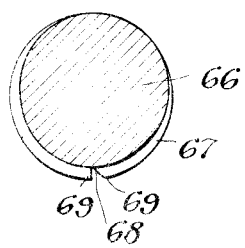
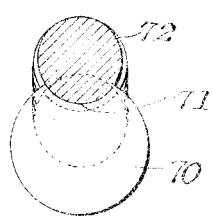
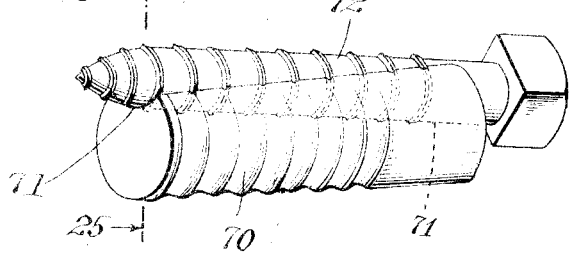
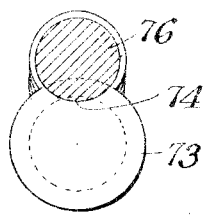
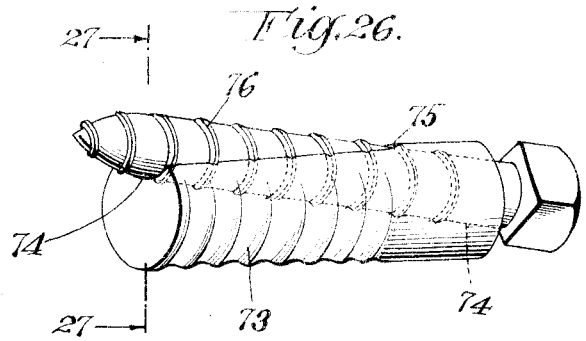
WITNESSES
INVENTOR
Henry W. Pleister
BY
ATTORNEY

UNITED STATES PATENT OFFICE.

HENRY W. PLEISTER, OF WESTFIELD, NEW JERSEY, ASSIGNOR TO HENRY B. NEWHALL.

BOLT-ANCHOR.

1,155,613.   Specification of Letters Patent.   Patented Oct. 5, 1915.

Application filed January 20, 1915. Serial No. 3,328.

*To all whom it may concern:*

Be it known that I, HENRY W. PLEISTER, a citizen of the United States, and a resident of Westfield, in the county of Union and State of New Jersey, have invented certain new and useful Improvements in Bolt-Anchors, of which the following is a specification, taken in connection with the accompanying drawings, which form a part of the same.

My invention relates to bolt anchors, and one in which both the shield and the bolt or screw contact directly with the walls of the support in which they are mounted.

More particularly it relates to a one part shield which may be manufactured and sold separately as an article of manufacture.

Previous to my invention it has been the common practice to have shields and anchors with two or more expanding members between which the bolt or screw was mounted, the different members of the shield or anchor being forced apart as the bolt or screw was inserted between them. In such bolt anchors the threads of the screw or bolt engage simply with the different members of the shield or anchor and do not engage directly with the walls of the orifice. In the old practice the shields are formed of at least two members, and the anchors are provided with at least two tines or forks, it being understood that in the trade an "anchor" has an integral head from which extends two or more tines. Ordinarily the trade use the term "anchor" when referring to ductile material in which the male screw threads of the expanding member will cut their own coöperating female screw threads in the softer material of the anchor.

By my invention I omit entirely one of the expansible members and save all the expense incident to its manufacture, handling and shipping.

By my invention the screw threads of the bolt or screw engage directly with the walls of the orifice as well as with my expansion shield.

In my invention the complete "bolt anchor" comprises a shield member and the expanding member whether that be a bolt or screw.

I also preferably though not necessarily, when the shield is formed of malleable iron or similar material, provide it with screw threads, and generally, though not always, with means which will normally hold the bolt and shield together so that if desired they may be shipped, handled or stored as one bolt anchor.

I also form my shield, of ductile material, if desired, in which case the screw threads of the bolt or screw will cut their own coöperating threads in the shield.

I have shown in the accompanying drawings several illustrative embodiments of my invention, but of course it is to be understood that my invention is not to be confined simply to the forms illustrated.

In these drawings the same reference numerals refer to similar parts.

Figure 1 is a longitudinal vertical section through a support and the work supported showing one form of my bolt anchor in side elevation; Fig. 2 is a perspective view of the form of one part shield illustrated in Fig. 1; Fig. 3 is a longitudinal vertical section through the support, the work supported and also through another form of shield; Fig. 4 is a perspective view of the form of shield shown in Fig. 3; Fig. 5 is a longitudinal vertical section similar to Fig. 3 except that in this figure the shield is formed of some comparatively soft ductile material, which is softer than the material of which the bolt is formed, so that the latter will cut its own screw thread in the shield; Fig. 6 is a perspective view of the ductile shield shown in Fig. 5; Fig. 7 is a longitudinal vertical section similar to Fig. 1 except that in this figure the shield is formed of some ductile material and is provided with a rib in which the bolt will cut its own coöperating screw threads; Fig. 8 is a perspective view of the shield shown in Fig. 7; Fig. 9 is a longitudinal section through a support and the work supported showing a different form of shield which is thick at one end, and at the other end is comparatively thin, or of less area in cross section. This forms an inclined surface to coöperate with the screw threads of the screw or bolt. In Fig. 9 the aperture in which the bolt anchor is located, is at an angle to the face of the wall; Fig. 10 is a longitudinal vertical section the same as Fig. 9 except that in this figure the hole in the wall is formed at right angles to the face of the wall. In this figure also a beveled washer is shown in section to compensate for the inclination of the head of the bolt; Fig. 11 is a perspective view of the form of one part shield shown in Figs. 9 and 10; Fig. 12 is a transverse vertical section through a channel beam and its support showing my bolt anchor adapted to coöperate directly with a flange of the channel beam so as to positively hold it to its support; Fig. 13 is a longitudinal vertical section through a support and the article supported showing a tapered semi-cylindrical one part shield formed of some ductile material into which the threads of the bolt will cut their own coöperating female threads. In this figure the hole in the support is at right angles to the face of the support and a beveled washer is shown to compensate for the inclination of the bolt head; Fig. 14 is a perspective view of the ductile shield illustrated in Fig. 13; Fig. 15 is a longitudinal vertical section through the support and the article supported showing a modified form of shield having lugs adapted to be bent sufficiently to prevent the unintentional separation of the shield and bolt. In this figure the hole is substantially at right angles to the face of the wall; Fig. 16 is a transverse vertical section substantially on the line 16—16 of Fig. 15; Fig. 17 is a transverse vertical section substantially on the line 17—17 of Fig. 15; Fig. 18 is a longitudinal vertical section the same as Fig. 15 except that in this figure the hole is inclined with relation to the face of the wall and the shield is shown in side elevation; Fig. 19 is a fragmentary vertical section showing a modified construction in which one lug is used rather than two as shown in Fig. 17; Fig. 20 is a side elevation of one form of my ductile shield coöperating with a wood screw; Fig. 21 is a side elevation of a further modified form of shield in which the body member has a double inclined surface, the exterior surface being provided with transverse ribs of progressively increasing height from the front to the rear of the shield to compensate for the taper of the exterior surface of the body member. This form is the same as the others except that it is a little more economical to manufacture in that less metal is needed to form the body member of the shield. Fig. 22 is a side elevation of a modified form of lag screw in which the thread is interrupted to form cutting points; Fig. 23 is a vertical cross section on line 23, 23 of Fig. 22; Fig. 24 is a perspective view of a modification; Fig. 25 is a vertical cross section of the modification shown in Fig. 24; Fig. 26 is a perspective view of another modification; Fig. 27 is a vertical cross section of the modification shown in Fig. 26.

In all forms of my invention the bolt or screw contacts directly with the surface of the hole in the support and also contacts with the one part shield.

In Figs. 1 to 8 I have shown a support 1 and a bolt anchor formed of a shield and a bolt. For example in Fig. 1 the bolt anchor is formed of a lag bolt or lag screw 2 and a shield 3. This shield 3, in this form of my invention, is a semi-cylindrical member, Fig. 2, formed with inclined transverse grooves 4, 4, which coöperate with male screw threads 5, 5 upon the lag bolt 2. This shield 3 is formed of substantially the same cross section at each end so that its surface 6 will be substantially at right angles to its end 7 as well as at right angles to its other end. This shield may be of any suitable material as for example malleable iron, or it may be a forging, though, for the sake of economy in manufacture, it would ordinarily be cast of malleable iron. However, it may be made of any other material. When this bolt anchor, formed of the shield 3 and the lag bolt 2 is inserted in the hole or aperture 8 in the support 1, the work 9 will be held to the face 10 of the wall, which may be of brick, terra cotta, stone, concrete, wood or any other material.

In screwing the lag screw 2 into the aperture 8 its male screw threads 5, 5 will engage and coöperate with the inclined grooves 4, 4, in the shield 3 and will also directly contact with a portion of the wall 8. Whether or not these male screw threads 5, 5, will cut into the material of the support 1, will depend upon what material the support is formed of. In any material which is harder than that of the metal of the screw threads, these screw threads 5, 5, on the lag screw 2, or other expanding member, will bear against the wall of the opening 8. Even in such hard material perceptible indentations will probably be made from the continuous wearing of the spiral thread on the bolt engaging the same point of contact in the hard material of the support. In this form the expanding action will be insured by the taper of the lag bolt 2. This taper will cause the shield 3 to be forced firmly against the support 1 and the reaction will cause the threads 5, 5 to bear all the more firmly against the wall or support. This expansion insures the work 9 being firmly held to the face 10 of the support 1. To still further assist the cutting of indentations in the form of screw threads in the surface of the hole, I may interrupt the spiral threads 67 of the screw 66 with a slot 68 so as to form cutting points 69, 69 which will act upon the hole as a machine tap and facilitate the formation of threads on the inner surface of the hole. See Figs. 22 and 23. Of course if the support 1 is formed of brick, cinder, concrete, soft stone, wood or other similar materials, the male interrupted threads 5, 5, on the lag bolt 2 will bite into, more or less, the surface of the hole or aperture 8, in which case, more or less, deep coöperating female threads will be formed in the support 1 as the lag screw 2 is screwed home.

Instead of making the shield 3 with a flat face, I may provide a shield 11 with a straight axial bore or groove 12, Fig. 4, and provide that groove with interrupted screw threads 13, 13. This shield may be made of malleable iron or be a drop forging the same as in Figs. 1 and 2. This form of shield is shown in section in Fig. 3 where the work 9 is held in the same manner, as previously described.

Instead of forming my shield of malleable iron, or of similar hard material, I may form it as in Fig. 6 of comparatively soft material which would be softer than the lag bolt 2 so that the screw threads 5, 5, on the bolt will cut their own cooperating female screw threads in the shield 14. This shield 14 is formed of some ductile material and I provide it with an axial bore 15 to receive the lag bolt 2, or other expanding member, so that when it is placed in the hole 16 of the support 1, the male screw threads 5, 5 will cut their own cooperating screw threads in the bore 15. In this form of my invention my bolt anchor comprises a lag or other screw 2 and a one part ductile shield 14. Figs. 5 and 6.

In some instances I may provide a shield 17 with a longitudinal extending rib 18 in which the screw threads 5, 5 of the lag bolt 2 will cut their own cooperating screw threads. Preferably, this longitudinal extending rib is formed of the same material as the body 17 of the shield, see Figs. 7 and 8.

In practice I preferably, though not necessarily, form the shield with an inclined surface so that the end of the shield which is last to be inserted in the hole, and which lies adjacent to the face of the wall, will be of less area than the other end of the shield. I have shown this form in Figs. 9 to 20 inclusive and practically also in Fig. 21 which is a modification whereby the same result is accomplished.

In Figs. 9, 10 and 11 I form my bolt anchor of a malleable iron or drop forging shield 19, though of course it is to be understood that the shield may be formed of any comparatively hard material, in combination with a lag or other screw 20. This shield is substantially semi-cylindrical with its end 21 of less area than the end 22. It is preferably provided with transverse grooves 25, 23 which cooperate with the male threads 24, 24 on the lag screw 20. These grooves are cast in the shield or forged if the shield is made as a drop forging. By arranging the shield with one end thinner than the other, or of less area, an inclined surface 25 is formed and it is up this inclined surface that the screw or bolt 20 is screwed home in the support.

In Fig. 9 I have shown the bolt anchor formed of the shield 19 and the lag bolt 20 mounted in a hole 26 which is drilled or otherwise made in the support 1 at an angle to the face 27. If this hole is drilled at the proper angle it will exactly compensate for the inclination of the lag bolt 20 due to it following the inclined surface 25 of the shield. In such a case the work 9 will be brought up flush to the face 27 of the support, and the head 28 of the bolt 20 will bear firmly against the work 9.

In case the longitudinal axis of the hole 29 is drilled in the support 1 at right angles to the face 27 I preferably though not necessarily, use a beveled washer 30 between the head 28 of the bolt 20 and the work 9, Fig. 10. Without such a washer only a portion of the head 28 would engage with the work 9. This inclination of the head of the bolt, when the hole in the support is substantially at right angles to the face, can be put to many practical advantages. I have shown for example in Fig. 12 a base or support 31 having a hole 32 drilled substantially at right angles to the face 33 of the support 31 which may be of concrete, stone or any other material. In this figure I have shown a bolt anchor comprising the shield 19 and the lag screw 20 mounted in the opening 32 so that the head 28 will be inclined with relation to the face 33 of the support. When the work to be supported or held has an inclined surface, web, flange, lug or other member, this inclination of the head of the bolt will exactly cooperate with such an inclined member of the work to be supported or held.

In Fig. 12 I have shown the work to be held or supported as a channel member 34 having an inclined flange 35 with which the head 28 of the bolt 20 exactly cooperates when it is screwed home in the opening 32 of the support 1. In other words, the work supported or held, has itself some inclined surface or member which will exactly cooperate with the head of the bolt when it is inclined with relation to the face of the support. While I have shown for example a channel member 34 it is of course obvious that the work may be an I-beam, T-rail, rail, structural member, electrical apparatus having an inclined lug or member or any other structure having an inclined holding surface. In such a construction as illustrated, for example in Fig. 12, the holding capacity of the bolt anchor will be increased for the stress exerted upon the head 28, of the bolt will be partly shear and partly tension.

The form of shield having an inclined surface to engage with the bolt or screw gives a quicker expansion to the bolt anchor. The shield in this form may also be made of some comparatively soft ductile material in which the threads of the screw, whether it be a lag bolt or wood screw being immaterial, would cut their own coöperating screw threads. I have shown such a bolt anchor in Figs. 13 and 14 in which the shield 36 is formed of some ductile material, as for example, an alloy of lead, having an inclined face 37 due to the fact that the end 38 is of greater area than the end 39. When this ductile shield 36 is placed in an opening 40 of the support 1 a quick expansion is obtained by the lag or other bolt 41 being screwed up the inclined surface 37 to secure the work 9. When used in this form the bolt will center itself upon the inclined plane 37 and travel in a line parallel with the axis of the shield, as it will be held in that position by the curvature of the hole in the support. In this form the male screw threads 42, 42 will cut their own female screw threads in the face 37 of the shield and will bear directly upon the material of the support whatever that may be. Of course if the material of the support 1 be brick, cinder concrete, or wood or any material softer than that of the bolt, more or less deep female screw threads will be formed in the support by the male threads 42, 42. This hole 40 is shown drilled at substantially right angles to the face 27 of the support so that I preferably employ a beveled washer 30 to compensate for the inclination of the head 43 of the bolt. In this form my complete bolt anchor comprises the lag or other bolt 41 and the ductile shield 36.

In the constructions I have previously described I have shown my invention in the simplest form. Preferably, though not necessarily, I form the shield member with some means which will prevent the accidental disengagement of the screw threads on the bolt and the female screw threads in the shield when the bolt anchor is not in use. This is an advantage in case it is desirable to ship or store the bolt anchors. The means which I preferably employ to hold the bolt and shield together also furnishes a support or bearing for the bolt while under the shearing strains.

In Figs. 15 to 20 I have shown the preferred form of my bolt anchor in which the shield 44 of malleable iron, or drop forging or other comparatively hard material, is provided with an inclined groove 45, the area of the outer face 46 being less than the area of the inner face 47 of the shield 44. This groove is provided with female screw threads 48, 48 the same as those shown in Fig. 4, except of course, in Fig. 4 the groove is not inclined. At the outer end 46, I provide retaining means to normally hold the lag or other screw 49 to the shield 44. These means which I preferably employ are one or more integral lugs 50, 50 which are preferably of somewhat less thickness than the adjacent portion of the shield. They are cast for example as shown in dotted lines in Fig. 17 and then bent to substantially form a ring through which the bolt is screwed home. Preferably, though not necessarily, I form two sets of these lugs 50, 50, one set being adjacent to the outer surface 46 of the shield and the other set adjacent to the first set, see Figs. 15 and 18.

Instead of forming these lugs in pairs so that each pair can be bent to substantially form a ring I may of course, form a shield 51 with an elongated lug 52, Fig. 19 which could be cast as shown in dotted lines and then bent as shown in full lines in this figure.

Preferably though not necessarily, the bolt anchor is inserted in the opening 53 of the support 1 with the lugs downward and the cross ribs 54 of the shield 44 adapted to bite into the upper portion 55 of the support 1. I preferably so locate the bolt anchor in the opening so as to compensate for shearing strains due to supporting the work 9. The lugs 50, 50 serve as a bearing for the bolt 49, so that any shearing strains due to supporting the work 9 will tend to force the male threads 56, 56 into closer contact with the female threads 48, 48 in the shield 44. That is the greater the shearing strain, firmer will be the contact or engagement between the male threads of the bolt and the female threads of the shield which will cause the transverse ribs 54, 54 of the shield to bite all the more into the wall 55, of the support to make a firmer and stronger expansion. In this Fig. 15 the hole 53 is shown drilled substantially at right angles to the face 27 of the support 1, in which case I preferably, though not necessarily use a beveled washer 30.

In Fig. 18 I have shown the same bolt anchor as in Fig. 15 except the hole 57 is drilled at an angle to the face 27 so that the head 58 of the bolt will bear, at all points, firmly against the face of the work 9.

I also make this preferred form of bolt anchor with a ductile shield 59, Fig. 20 so that it may coöperate with a wood screw 60. The shield 59 is formed the same as those shown in Figs. 15, and 18 and provided with lugs 61, 61 which are bent in the same manner as shown in Fig. 17. In this particular form my bolt anchor comprises the ductile shield 59 and a wood screw 60.

It is of course to be understood that in all forms of my inventions the bolt anchor may be sold as an article of commerce, or the shield alone may be so sold, the other member of the bolt anchor being supplied by the jobber, retailer or user.

To economize in the amount of metal used in the shield I may, in some case, form a shield 62 having the inclined surface 63 provided with screw threads to coöperate with the lag or other bolt or screw and I provide transverse ribs 64 of varying height, those at the inner end, which will be the end furtherest in the hole, being of greater height than those nearer the other end of the shield. This construction simply saves metal by making the grooves 65, 65 between the different transverse ribs 64, 64 of greater depth, at the inner end, than in the other forms.

In addition to the marked economy in manufacture and ease of application of my bolt anchor and its advantage in directly cooperating with an inclined engaging surface on the work to be supported or held, it also prolongs the life of the support, if that support happens to be wood. In light work, for example, in securing storm sash and awnings, a regular wood screw is often replaced in the same hole, the threads of the screw on practically every new insertion cutting new threads in the wood which disintegrates the fiber of the wood and destroys its holding capacity. In such light work by my invention, only a portion of the surface of the hole would be engaged on each insertion of the screw, so that the life of the fiber of the wood would be prolonged. Not only this, but the wedging action of my bolt anchor would compress or condense any partly comminuted fiber of the wood in the hole which would give the expansion bolt a strong hold even though the screw be repeatedly reinserted in the same hole.

In some cases I may form my shield as a cylinder with an inclined bore and an open side. In Figs. 24 and 25 I have shown a cylindrical shield 70 having a bore 71 at an incline to the longitudinal axis of the cylinder. The screw or bolt 72 coöperates with this inclined bore as shown in Figs. 24 and 25 giving a powerful expansion.

I may also form my shield as a cylinder 73 having a bore 74 which starts substantially concentric with the longitudinal axis of the shield 73 and then inclines to said axis to form a partly closed slot 75 on the periphery of the shield 73. In this form the bolt or screw 76 emerges from the surface of the shield at an angle to the longitudinal axis of the shield. See Figs. 26 and 27.

Having thus described this invention in connection with the illustrative embodiments thereof to the details of which I do not desire to be limited, what is claimed as new and what it is desired to secure by Letters Patent is set forth in the appended claims:

1. A bolt anchor comprising in combination a shield and a rotative bolt engaging therewith, said bolt being exposed to engage its threads with the wall or support to co-act with the shield to expand the bolt anchor.

2. A bolt anchor comprising in combination a rigid shield and a rotative bolt engaging therewith, said bolt being exposed to engage its threads with the wall or support to co-act with the rigid shield to expand the bolt anchor.

3. A bolt anchor comprising in combination a shield provided with internal interrupted screw threads, and a bolt to engage said threads, both said shield and bolt being exposed on a part thereof to engage with the support to expand the bolt anchor.

4. A bolt anchor comprising in combination a shield, a bolt having its threaded shank engaging said shield on one side and exposed so as to also engage directly with the walls of the opening in the support.

5. A bolt anchor comprising in combination a substantially rigid shield, a bolt having its threaded shank engaging said shield on one side and exposed so as to also engage directly with the walls of the opening in the support.

6. A bolt anchor comprising in combination a substantially rigid shield provided with internal interrupted screw threads, a bolt having its threaded shank engaging said shield on one side and exposed so as to also engage directly with the walls of the opening in the support and with the screw threads of the shield.

7. A bolt anchor comprising in combination a shield having an inclined surface to engage with the bolt, and a bolt having its threaded shank engaging said shield on one side and exposed so as to also engage directly with the support to expand the bolt anchor.

8. A bolt anchor comprising in combination a shield having an inclined grooved surface to engage with the bolt, and a bolt having its threaded shank engaging said shield on one side and exposed so as to also engage directly with the support to expand the bolt anchor.

9. A bolt anchor comprising in combination a shield having an inclined surface provided with interrupted screw threads to engage with the bolt, and a bolt having its threaded shank engaging said shield on one side and exposed so as to also engage directly with the support to expand the bolt anchor.

10. A bolt anchor comprising in combination a shield having an inclined grooved surface provided with interrupted screw threads to engage with the bolt, and a bolt having its threaded shank engaging said shield on one side and exposed so as to also engage directly with the support to expand the bolt anchor.

11. A bolt anchor comprising in combination a shield and a bolt, means to normally hold the bolt to the shield, said shield being constructed to permit the bolt to engage directly with the shield and with the wall of the support to expand the bolt anchor.

12. An article of manufacture comprising a single shield member having an inclined surface and an open side to permit a bolt to engage directly with the wall of the support and means to normally hold the bolt from accidental disengagement from said member.

13. An article of manufacture comprising a single shield member having an inclined surface, an open side to permit a bolt to extend through and engage directly with the wall of a support, and one or more lugs to hold the bolt and shield together.

14. A bolt anchor comprising in combination a shield and a bolt, integral means to normally hold the bolt to the shield, and means adapted to permit the bolt to engage directly with the shield and with the wall of the support.

HENRY W. PLEISTER.

Witnesses:
ALAN M. JOHNSON,
LOUISA LOEHR.